(12) United States Patent
Warinner et al.

(10) Patent No.: US 6,394,474 B1
(45) Date of Patent: May 28, 2002

(54) FRONT AIR SPRING SUSPENSION WITH ANTI-DIVE AND ANTI-ROLL PROPERTIES

(75) Inventors: Derek K. Warinner, New Haven; Justin W. Vig; Chad M. Harshbarger, both of Fort Wayne, all of IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/612,346

(22) Filed: Jul. 6, 2000

(51) Int. Cl.[7] .............................................. B60G 11/46
(52) U.S. Cl. ..................... 280/124.104; 280/124.116; 280/124.157; 280/124.163; 280/124.128; 280/124.131; 267/52; 267/263; 267/271
(58) Field of Search ............... 280/124.104, 124.116, 280/124.157, 124.163, 124.162, 124.131, 124.128, FOR 175, FOR 177, FOR 151, FOR 150, FOR 159, FOR 160; 267/47, 46, 52, 260, 263, 271

(56) References Cited

U.S. PATENT DOCUMENTS

| | | | | |
|---|---|---|---|---|
| 2,569,168 A | * | 9/1951 | Hellwig | 267/192 |
| 4,919,399 A | * | 4/1990 | Selzer et al. | 267/31 |
| 4,966,387 A | * | 10/1990 | White, IV | 280/124.163 |
| 5,046,752 A | * | 9/1991 | Stephens et al. | 280/124.157 |
| 5,346,247 A | * | 9/1994 | Snyder | 280/124.116 |
| 5,351,986 A | * | 10/1994 | Hedenberg et al. | 280/124.163 |
| 5,470,096 A | * | 11/1995 | Baxter | 280/124.116 |
| 5,938,221 A | * | 8/1999 | Wilson | 280/124.163 |
| 6,086,077 A | * | 7/2000 | Stuart | 280/124.116 |
| 6,234,502 B1 | * | 5/2001 | Sobina | 280/124.163 |

FOREIGN PATENT DOCUMENTS

| | | | | |
|---|---|---|---|---|
| DE | 2609928 A1 | * | 9/1977 | |
| DE | 003824789 A | * | 1/1990 | 280/FOR 175 |
| DE | 4334369 A1 | * | 4/1995 | |
| FR | 1449819 | * | 7/1966 | 280/FOR 175 |
| JP | 357044506 A | * | 3/1982 | 280/FOR 175 |

* cited by examiner

*Primary Examiner*—Lanna Mai
*Assistant Examiner*—Ruth Ilan
(74) *Attorney, Agent, or Firm*—Jeffrey P. Calfa; Neil T. Powell; Dennis Kelly Sullivan

(57) ABSTRACT

A suspension system for the steering axle of a vehicle chassis includes a right side air spring and a left side air spring. In the preferred embodiment leading rigid arms link each end of the steering axle to a pivoting mount on the chassis and transmits brake reaction torque as a lifting force to the chassis. Spring half leaf trailing links connect each end of the steering axle to the chassis, rigid leading arms provide anti-roll capacity as well as help in locating and stabilizing axle position.

7 Claims, 4 Drawing Sheets

FRONT AIR SPRING SUSPENSION WITH ANTI-DIVE AND ANTI-ROLL PROPERTIES

BACKGROUND OF THE INVENTION

1. Field of the Invention

The present invention relates to vehicle front end suspension systems and, more particularly, to an air spring based suspension system directed to improving vehicle stability by reducing front end dive during braking and increasing resistance to vehicle roll during cornering.

2. Background

Truck suspension systems are designed to meet each of several not wholly compatible goals which include: absorbing road shock and providing a comfortable ride; stabilizing the vehicle, especially during cornering and braking, to help the driver keep control of the vehicle; and maintaining proper axle spacing and alignment, which also helps to keep the vehicle under control and extend tire life. These goals must met while supporting the vehicle's weight over a wide range of vehicle load conditions.

There are four basic categories of suspension systems used on trucks: leaf spring systems; equalizing beam systems; torsion bar systems; and air spring systems. The categories are not mutually exclusive and elements of more than one system may be combined to build a hybrid suspension system, at some cost both in terms of money and complexity.

Air spring systems have recently gained in popularity and have been applied to a variety of truck axles, including of particular interest here, the steering axle. Air spring suspensions give excellent load and vibration isolation to the cab by eliminating the interleaf friction found in traditional multiple leaf spring designs. The deflection rate of air springs can be adjusted automatically to compensate for vehicle load changes. As a result, vehicle height does not vary with load or positioning of the load, thereby enhancing driver control. In addition, an air spring usually has a lower deflection rate than a leaf spring exerting the same force giving the system greater capacity for absorbing shocks for a given displacement between the axle and the frame.

Air springs are also employed to maintain a constant vehicle height despite changes in vehicle loads. As such it may sound odd to refer to a deflection rate for such springs since the deflection rate for a compression spring equates spring deflection with force generated. Air springs, unlike conventional springs, can be and are used to generate a varying amount of force while maintaining a fixed height displacement. This is effected by changing air pressure in the air spring in response to changes in vehicle height, either dumping or adding air to the air spring by valves. Conventional springs must of course deflect to generate a balancing counter force. In effect, as air pressure is changed in an air spring in order to maintain a constant height, the deflection rate of the spring is changing. Thus, air springs may be termed controllable rate springs or controllable deflection springs.

In an air spring based system, air bellows are positioned with respect to an axle and a vehicle frame to support the frame from the axle. The air spring can be used to supplement a leaf spring arrangement by being placed between the leaf spring and the vehicle frame. Commonly though, air spring systems replace the leaf spring. In a typical application of air springs to a steering axle, an air spring is placed adjacent each wheel over the axle and directly below the side rails of the vehicle frame.

Pure air spring based systems are not without problems. Air springs, for all of their advantages in providing a comfortable ride and adaptability to changing load conditions, have required substantially more complex and costly suspension designs than have leaf springs. A leaf spring provides two frame mounting points fore and aft of the steering axle to aid in axle stabilization and location, whereas an air spring provides nothing in the way of axle stabilization and location. An air spring suspended steering axle has typically been stabilized using trailing connecting rods or arms between the frame rails and the steering axle. A lateral track bar has provided lateral stabilization for the axle. Trailing arm systems achieve substantial front end anti-roll stiffness by positioning rigid arms between the frame and the axle, with each arm being pivotally attached to the frame and rigidly attached to the axle. The trailing arm design used with air springs at the vehicle front end is not without disadvantages. During vehicle braking, the front ends of vehicles tend to dive. In traditional leaf spring suspension designs, where the leaf spring is mounted to the frame at two points, ahead of the solid axle and following the axle, the torque reaction force generated by the brakes on the axle in turn generates a reactive upward force on the frame through the leaf springs aft mounting point and a downward reactive force through the forward mounting point. No net downward force is transmitted from braking. In trailing arm/air spring suspension designs this balance is lost. Trailing arm designs transmit the brake reaction torque to the frame only through the forward trailing arm mount as a downward force and thereby increase dive. Most trailing arm designs are also poor at maintaining axle position laterally, necessitating the use of a lateral track bar to hold axle position.

SUMMARY OF THE INVENTION

It is an object of the invention to provide an air spring suspension system with improved vehicle stability characterized by increased resistance to front end dive on braking and improved resistance to roll.

It is another object of the invention to provide a suspension system which enhances steering axle lateral stability without use of a track bar.

The foregoing objects are achieved as is now described. The invention provides a suspension system for the steering axle of a vehicle chassis. The suspension includes a right side air spring and a left side air spring. Both air springs are mounted above the axle and below their respective sides of the vehicle chassis for supporting the chassis. Auxiliary axle stabilizing and locating apparatus include pairs of hanger brackets depending from the vehicle chassis forward of the steering axle, one on each major side of the vehicle chassis and additional pairs of hanger brackets depending from the vehicle chassis aft of the steering axle, one on each major side of the vehicle chassis. Shackle linkages are coupled between forward hanger brackets. A right side spring half leaf and a left side spring half leaf are mounted between the frame rails and opposite ends of steering axle. Each spring half leaf is pivotally connected at one end to shackle linkages and at the opposite end is rigidly mounted on the steering axle beneath the air springs. A right side rigid arm and a left side rigid arm complete positioning of the axle. Each rigid arm is pivotally coupled at one end to hanger brackets, depending from a frame rail, and at the opposite end rigidly attached to the steering axle below an air spring. The rigid-arms are preferably connected as leading arms, but may be mounted as either leading or trailing arms, depending on the location of a steering linkage to the axle.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
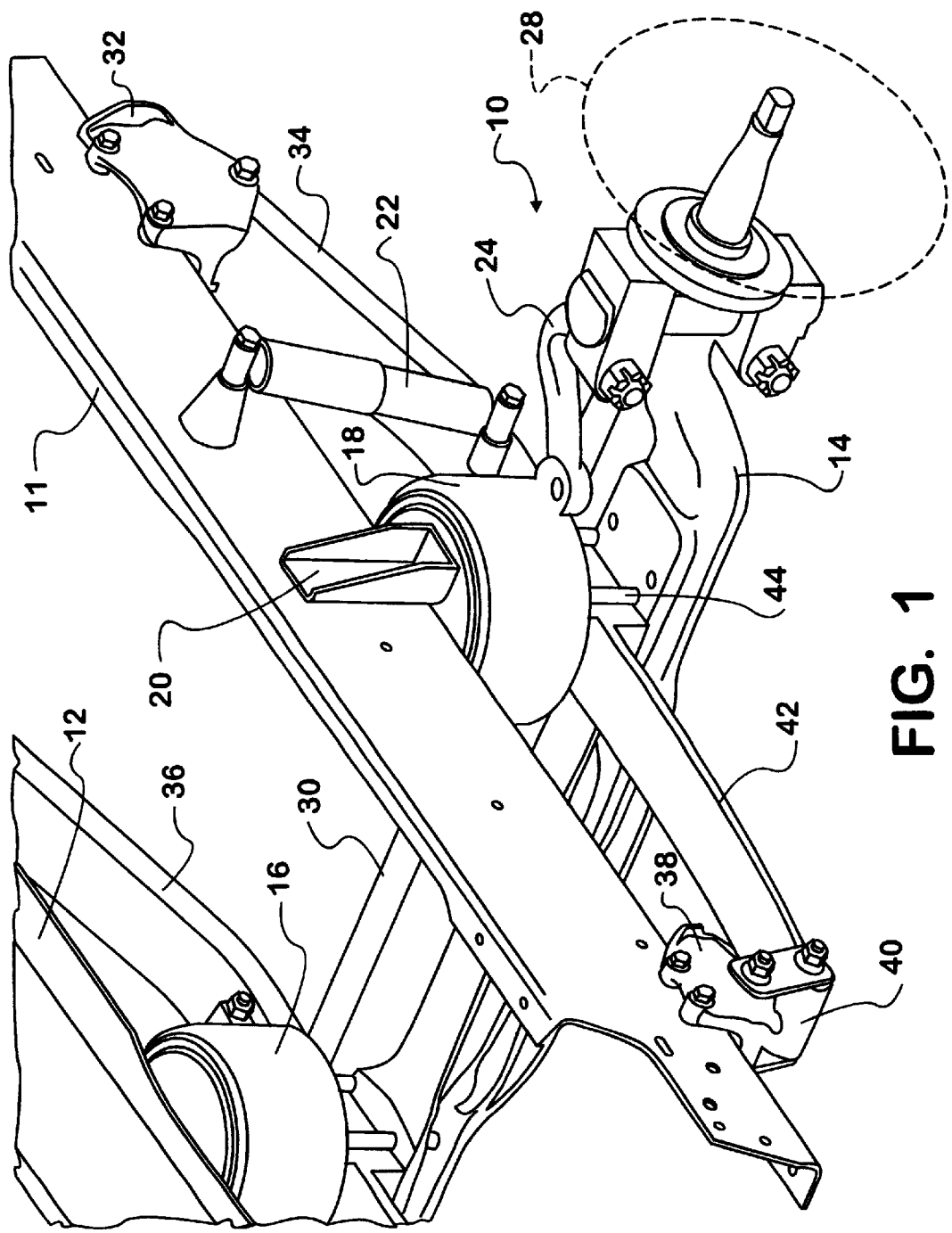
FIG. 1 is a perspective view of a portion of a vehicle frame incorporating one embodiment of the invention.
Figure 2:
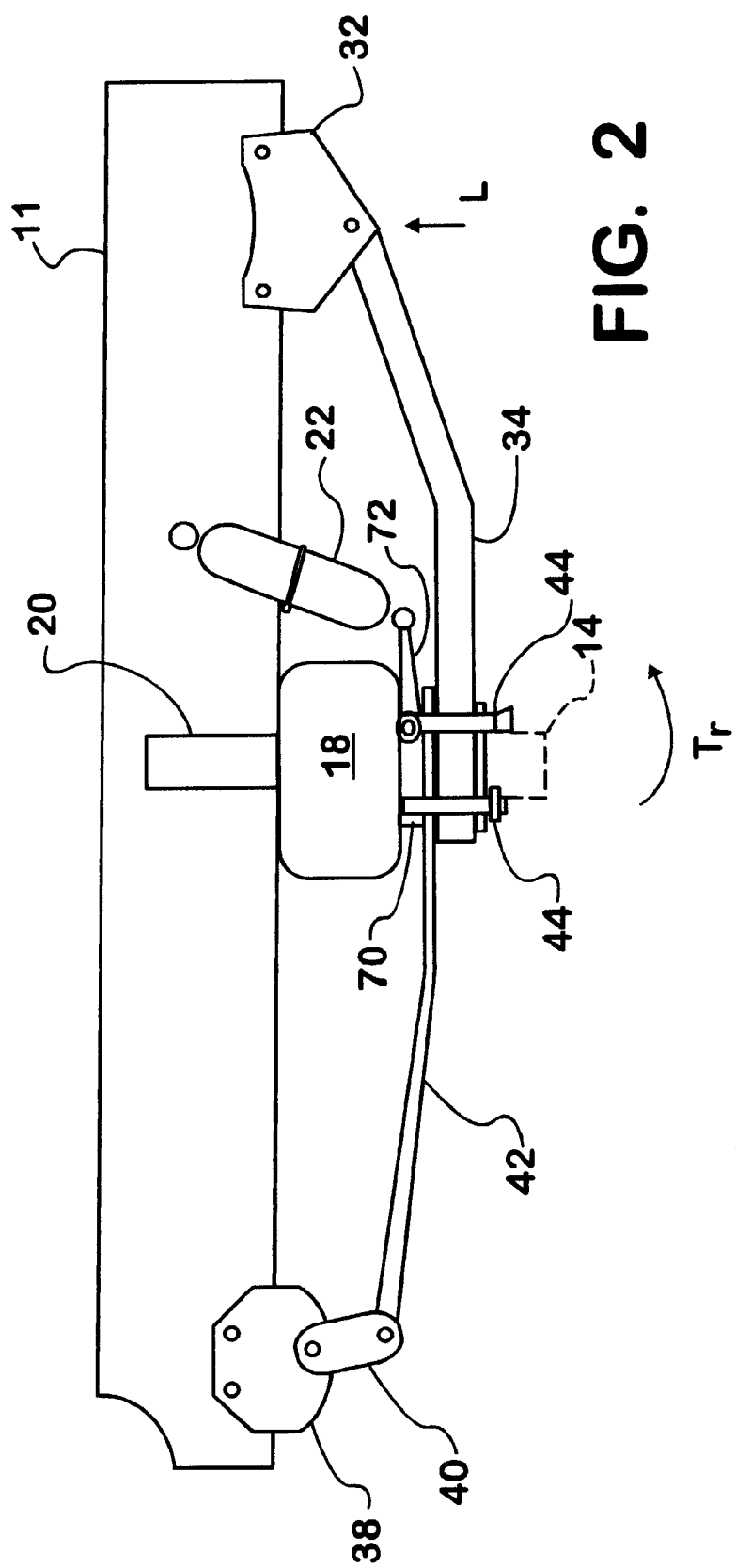
FIG. 2 is a side elevation of the embodiment of FIG. 1.

Referring now to FIGS. 1 and 2, a first embodiment of a suspension system 10 in accordance with the invention is illustrated. Suspension system 10 supports vehicle chassis frame rails 11 and 12 from a steering axle 14. Frame rails 11 and 12 are directly supported by a pair of air springs 18 and 16, respectively. An air spring bracket 20 that helps position air spring 18 with respect to frame rail 11 is visible on the outside face of the frame rail. Steering axle 14 supports a steering linkage 30, which acts on right side wheel (not shown) from the left side wheel 28 (shown in shadow). Steering axle 14 carries brakes (not shown) for braking rotation of wheels mounted to the axle. A steering arm 24 allows connection to a steering gear box (not shown) by either a leading or trailing linkage. Whether the linkage is leading or trailing controls which embodiment of the invention may be applied to the vehicle. The principal features of the invention are auxiliary stabilization and localization of steering axle 14.

Where a leading linkage is used to connect to steering arm 24, the embodiment of FIGS. 1 and 2 is employed. In order to avoid suspension steering it is important to maintain the steering axle 14 in a position perpendicular to frame rails 11 and 12 and to keep the axle immobilized against lateral movement. Driver control of the vehicle is helped by limiting vehicle role and front end dive on braking. Since the right side suspension components mirror the left side suspension components, only the left side suspension is discussed in detail.

In the first embodiment, front end braking dive is controlled by employing rigid leading arms 34 and 36 as auxiliary stabilizing elements. Application of braking to wheel 28 results in torque being applied to steering axle 14 (labeled $T_r$ in FIG. 2). This force translates along rigid leading arm 34 as an upward force L to hanger 32, which is mounted aft of steering axle 14, counteracting front end dive. Leading arm 34 is rigidly linked to steering axle 14 between the bottom of air spring 18 and the steering axle. Leading arm 34 is pivotally coupled to hanger 32 such that hanger 32 defines an axis of rotation for steering axle 14 aft of the steering axle. In order to avoid suspension steering, the linkage to steering arm 24 must also be a leading arm arrangement. Rigid arm 34 is highly resistant to twist, and thus limits body roll of a vehicle on which it is installed.

Axle lateral location and stabilization are further helped by using a spring half leaf 42, which is rigidly mounted at one end to axle 14 between the rigid leading arm 34 and spacer 70, which are installed directly below air spring 18. Retainers 44 lock ends of leading arm 34, spring half leaf 42 and spacer 70 to axle 14. The opposite end of spring half leaf 42 must have some degree of freedom of movement along the direction of elongation of frame rail 11 to avoid having an axis of rotation for axle 14 forward of hanger 32. Accordingly, spring half leaf 42 is coupled to frame rail 11 by a pivoting connection to shackle linkages 40, which in turn are pivotally connected to a hanger 38 mounted on frame rail 11 forward of steering axle 14. Shackle linkages 40 swing in an arc parallel to the direction of elongation of frame rail 11. Shackle linkages 40 may comprise a one piece shackle box or multi piece arrangements.

A shock absorber 22 dampens oscillations of the suspension system. Shock absorber 22 is connected between a pivot mount on frame rail 11 and a pivot mount from spacer extension 72. The manner of use of shock absorber 22 is conventional.

Figure 3:
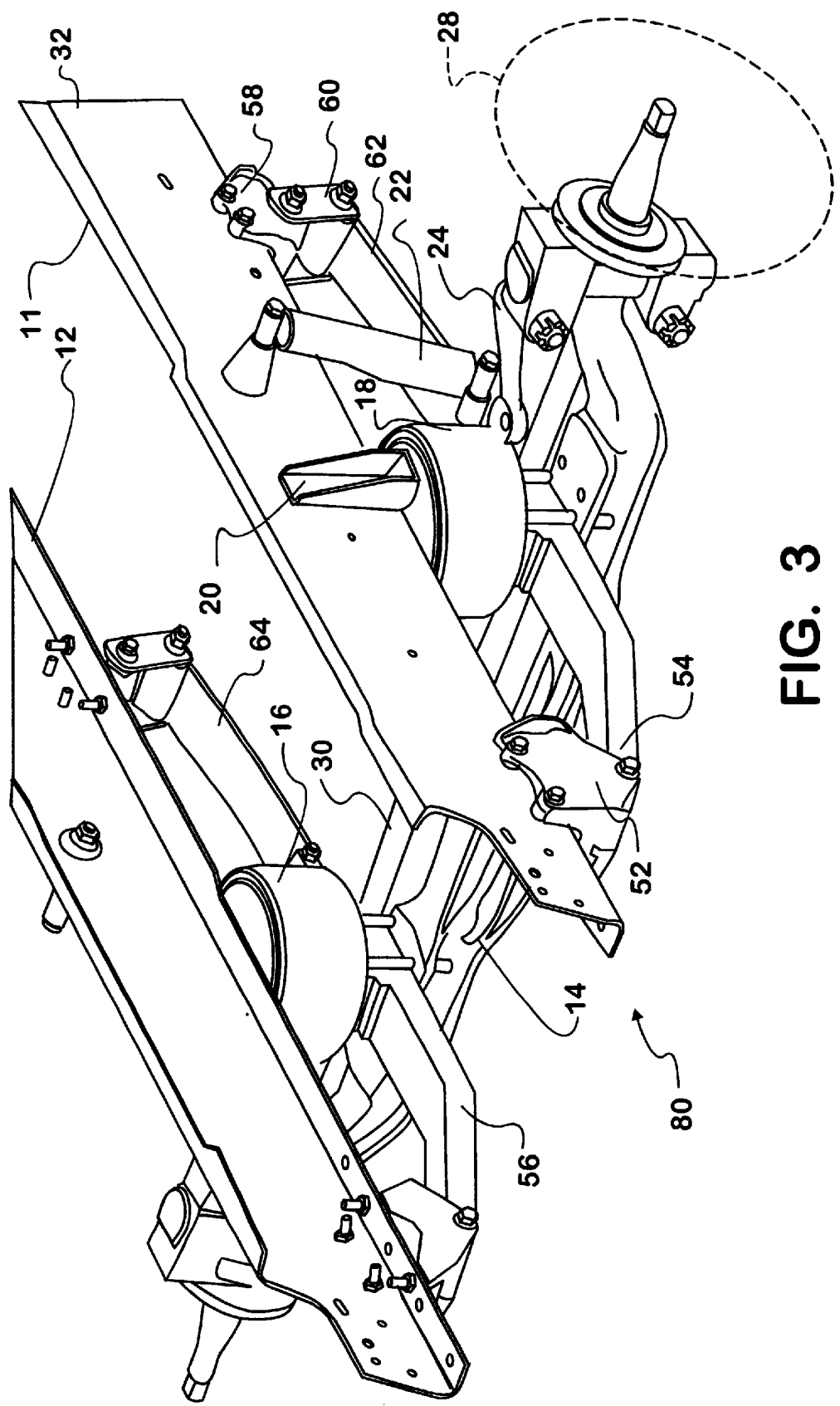
FIG. 3 is a perspective view of a portion of a vehicle frame incorporating a second embodiment of the invention.
Figure 4:
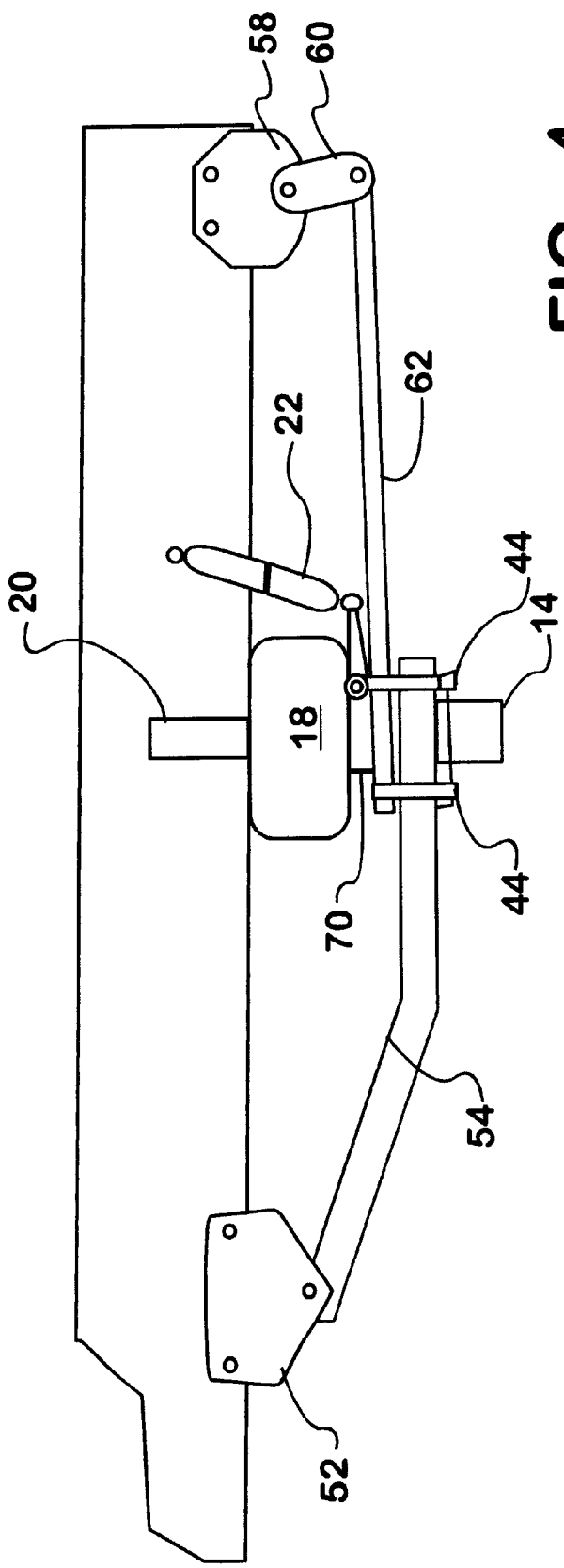
FIG. 4 is a side elevation of the embodiment illustrated in FIG. 3.

Referring to FIGS. 3 and 4, a second embodiment of the invention is illustrated. The second embodiment is intended for use with vehicles having trailing link steering systems. The second embodiment provides no brake anti-dive advantages and is used only on vehicles that are not or cannot be equipped with a leading steering link. Like numbers refer to like components in all of the figures.

Again, since the right side suspension components mirror the left side suspension components, only the left side suspension is discussed in detail. In the second embodiment, rigid trailing arms 54 and 56 act as auxiliary stabilizing elements providing substantial anti-roll support for a vehicle. Trailing rigid arm 54 is rigidly linked to steering axle 14 between the bottom of air spring 18 and the steering axle. Trailing arm 54 is pivotally coupled to forward hanger 52, such that hanger 52 defines an axis of rotation for steering axle 14 forward of the steering axle. In order to avoid suspension steering, the linkage to steering arm 24 must also be a trailing linkage. Rigid arm 54 is highly resistant to twist, and thus limits body roll of a vehicle on which it is installed.

Steering axle 14 lateral location and stabilization are further helped by using a spring half leaves 62 and 64, each of which are rigidly mounted at one end to axle 14. One end of spring half leaf 62 is fixed between the rigid leading arm 54 and spacer 70, which is installed directly below air spring 18. Retainers 44 lock ends of leading arm 54, spring half leaf 62 and spacer 70 to axle 14. The opposite end of spring half leaf 62 must have some degree of freedom of movement along the direction of elongation of frame rail 11 to avoid having an axis of rotation for axle 14 aft of hanger 52. Accordingly, spring half leaf 62 is coupled to frame rail 11 by a pivoting connection to shackle linkages 60, which in turn pivotally depend from an aft hanger 58 mounted on frame rail 11 aft of steering axle 14. Shackle linkages 60 can swing in an arc parallel to the direction of elongation of frame rail 11.

A shock absorber 22 dampens oscillations of the suspension system. Shock absorber 22 is connected between a pivot mount on frame rail 11 and a pivot mount on spacer extension 72. Shock absorber 22 is conventional.

The invention provides an air spring suspension system with improved vehicle stability characterized by increased resistance to front end dive on braking in the preferred embodiment and improved resistance to roll in all embodiments. In the preferred embodiment, braking torque on the steering axle is transmitted along a leading arm as an upward force on the vehicle chassis. Because of the use of both trailing and leading links, the suspension system does not require a track bar to maintain lateral location of the steering axle.

While the invention is shown in only one of its forms, it is not thus limited but is susceptible to various changes and modifications without departing from the spirit and scope of the invention.

What is claimed is:

1. A suspension system for a steering axle of a vehicle chassis, the suspension comprising:
   a right side air spring and a left side air spring, the right side air spring being mounted above the axle and below the right side of the vehicle chassis, the left side air spring being mounted above the axle and below the left side of the vehicle chassis;
   a first pair of hanger brackets depending from the vehicle chassis forward of the steering axle, one of the hanger brackets being disposed on each major side of the vehicle chassis;
   a second pair of hanger brackets depending from the vehicle chassis aft of the steering axle, one of the hanger brackets being disposed on each major side of the vehicle chassis;
   shackle linkages coupled to each of one of the pairs of hanger brackets;
   a right side spring half leaf and a left side spring half leaf, each spring half leaf being pivotally connected by one end to a shackle linkage and by the opposite end rigidly mounted on the steering axle beneath different ones of the air springs; and
   a right side rigid arm and a left side rigid arm, each rigid arm being pivotally coupled by one end to one of the remaining pair of hanger brackets, and by the opposite end rigidly attached to the steering axle below an air spring.

2. A suspension system as claimed in claim 1, the suspension further comprising:
   the right side and left side rigid arms being installed as trailing links.

3. A suspension system as claimed in claim 1, the suspension further comprising:
   the right side and left side rigid arms being installed as leading links.

4. A suspension system for resisting vehicle brake dive on a forward mounted axle installed on the vehicle chassis, the suspension comprising:
   a pair of rigid leading arms, each rigid leading arm being fixed at one end to the axle and at its remaining end pivotally coupled to a side of the vehicle chassis to transmit brake torque to the vehicle chassis as an upward force;
   a pair of trailing leaf half springs, each trailing leaf half spring being fixed at one end to the axle and at its remaining end pivotally and longitudinally translationally-coupled to a side of the vehicle chassis and to additionally provide lateral location for the axle; and
   a pair of air springs, each air spring being positioned above substantially opposite ends of the axle and above one each of the pair of spring half leaves and rigid leading arms fixedly attached to the axle.

5. A suspension system for resisting vehicle brake dive on a forward mounted axle as set forth in claim 4, the suspension further comprising:
   a pair of shock absorbers, one of which is connected to each of the opposite ends of the axle.

6. A suspension system for resisting vehicle brake dive on a forward mounted axle as set forth in claim 5, and further comprising:
   shackle linkages coupled between the vehicle chassis and each of the spring half leaves to provide a pivoting and translational link between the spring half leaf ends and the vehicle chassis.

7. A suspension system for resisting vehicle brake dive on a forward mounted axle as set forth in claim 6, wherein each of the pair of air springs is positioned above an a corresponding end of a spring half leaf, which in turn is positioned above the end of the leading arm, which in turn rests on the axle.

* * * * *

UNITED STATES PATENT AND TRADEMARK OFFICE
CERTIFICATE OF CORRECTION

PATENT NO. : 6,394,474 B1
DATED : May 28, 2002
INVENTOR(S) : Derek K. Warinner, Justin W. Vig and M. Chad Harshbarger It is certified that error appears in the above-identified patent and that said Letters Patent is hereby corrected as shown below:

<u>Title page,</u>
Item [75], should read:
-- [75] Inventor(s): Derek K. Warinner, New Haven; Justin W. Vig; M. Chad Harshbarger, both of Fort Wayne, all of IN (US) --

Signed and Sealed this

Twenty-seventh Day of May, 2003

JAMES E. ROGAN
*Director of the United States Patent and Trademark Office*